United States Patent
Johnson et al.

(10) Patent No.: US 8,255,362 B2
(45) Date of Patent: Aug. 28, 2012

(54) METHODS, SYSTEMS, AND COMPUTER PROGRAM PRODUCTS FOR PROVISIONING SOFTWARE USING LOCAL CHANGESETS THAT REPRESENT DIFFERENCES BETWEEN SOFTWARE ON A REPOSITORY AND A LOCAL SYSTEM

(75) Inventors: Michael K. Johnson, Apex, NC (US); Erik W. Troan, Cary, NC (US); Matthew S. Wilson, Raleigh, NC (US)

(73) Assignee: rPath, Raleigh, NC (US)

( * ) Notice: Subject to any disclaimer, the term of this patent is extended or adjusted under 35 U.S.C. 154(b) by 89 days.

(21) Appl. No.: 11/423,071

(22) Filed: Jun. 8, 2006

(65) Prior Publication Data

US 2006/0282479 A1    Dec. 14, 2006

Related U.S. Application Data

(60) Provisional application No. 60/688,623, filed on Jun. 8, 2005.

(51) Int. Cl.
*G06F 17/00* (2006.01)

(52) U.S. Cl. ........ 707/625; 707/635; 707/636; 707/637; 707/638; 707/639; 707/640; 707/674; 717/174; 717/168; 717/122

(58) Field of Classification Search ............ 707/104.1, 707/625, 635, 636, 637, 638, 639, 640, 674, 707/999.203; 717/174, 168, 122, 169, 170
See application file for complete search history.

(56) References Cited

U.S. PATENT DOCUMENTS

| | | | |
|---|---|---|---|
| 4,558,413 A | 12/1985 | Schmidt et al. | |
| 5,574,898 A | 11/1996 | Leblang et al. | |
| 5,675,802 A | 10/1997 | Allen et al. | |
| 5,778,368 A | 7/1998 | Hogan et al. | |
| 6,014,656 A | 1/2000 | Hallmark et al. | |
| 6,385,768 B1 | 5/2002 | Ziebell | |
| 6,535,893 B1 | 3/2003 | Friske et al. | |
| 7,028,057 B1 | 4/2006 | Vasudevan et al. | |
| 8,010,491 B2 * | 8/2011 | Edelstein et al. | 707/638 |
| 2003/0061366 A1 | 3/2003 | Musante et al. | |
| 2003/0061399 A1 | 3/2003 | Wagener et al. | |
| 2003/0115223 A1 * | 6/2003 | Scott et al. | 707/203 |
| 2003/0182652 A1 * | 9/2003 | Custodio | 717/122 |
| 2003/0220944 A1 * | 11/2003 | Lyman Schottland et al. | 707/203 |
| 2004/0015468 A1 | 1/2004 | Beier et al. | |
| 2004/0098420 A1 * | 5/2004 | Peng | 707/203 |
| 2004/0133444 A1 * | 7/2004 | Defaix et al. | 705/1 |
| 2004/0198496 A1 | 10/2004 | Gatto et al. | |
| 2005/0102288 A1 | 5/2005 | Liu et al. | |
| 2005/0132350 A1 * | 6/2005 | Markley et al. | 717/168 |
| 2005/0132356 A1 * | 6/2005 | Cross et al. | 717/174 |

(Continued)

OTHER PUBLICATIONS

Robert G. Brown, Jonathan Pickark; "YUM"; http://www.phy.duke.edu/~rgb/General/yum_HOWTO/yum_HOWTO.a4.pdf; Sep. 24, 2003.*

(Continued)

*Primary Examiner* — Dennis Truong
(74) *Attorney, Agent, or Firm* — Williams Mullen

(57) ABSTRACT

Software is provisioned by providing a repository that contains a software trove. A local changeset is generated that represents differences between a version of the software trove on the repository and a corresponding version of the software trove on a local system.

18 Claims, 9 Drawing Sheets

U.S. PATENT DOCUMENTS

| | | | |
|---|---|---|---|
| 2005/0234984 A1* | 10/2005 | Rogerson et al. | 707/104.1 |
| 2006/0112152 A1* | 5/2006 | Napier et al. | 707/203 |
| 2006/0130055 A1* | 6/2006 | Bozak et al. | 717/174 |
| 2006/0282479 A1 | 12/2006 | Johnson et al. | |
| 2006/0282480 A1 | 12/2006 | Johnson et al. | |
| 2006/0288054 A1 | 12/2006 | Johnson et al. | |
| 2006/0288055 A1 | 12/2006 | Johnson et al. | |
| 2007/0083571 A1 | 4/2007 | Meller et al. | |
| 2007/0180446 A1* | 8/2007 | Sirota et al. | 717/174 |
| 2008/0077629 A1 | 3/2008 | Lorenz et al. | |
| 2009/0094296 A1 | 4/2009 | Scholl et al. | |

OTHER PUBLICATIONS

Mike Foster, Joerg Iigen, Nicholas Kirkwood; "IBM RedBooks Tivoli Softerware Installation Service";http://www.redbooks.ibm.com/redbooks/pdfs/sg246028.pdf;Dec. 2000.*

ApplicationPackagingDeveloper's Guide, SunSoft Microsystems, Inc., 1994, pp. 1-147.

Non-Final Office Action dated Mar. 19, 2008 issued in U.S. Appl. No. 11/423,079.

Final Office Action dated Nov. 10, 2008 issued in U.S. Appl. No. 11/423,079.

Notice of Panel Decision from Pre-Appeal Brief Review dated Feb. 27, 2009 issued in U.S. Appl. No. 11/423,079.

Examiner's Answer dated Jul. 8, 2009 issued in U.S. Appl. No. 11/423,079.

Non-Final Office Action dated Mar. 20, 2008 issued in U.S. Appl. No. 11/423,063.

Final Office Action dated Nov. 19, 2008 issued in U.S. Appl. No. 11/423,063.

Notice of Panel Decision from Pre-Appeal Brief Review dated Feb. 27, 2009 issued in U.S. Appl. No. 11/423,063.

Non-Final Office Action dated Feb. 3, 2010 issued in U.S. Appl. No. 11/423,063.

Final Office Action dated Jun. 25, 2010 issued in U.S. Appl. No. 11/423,063.

Non-Final Office Action dated Jun. 10, 2010 issued in U.S. Appl. No. 11/423,053.

Non-Final Office Action dated Oct. 14, 2010 issued in U.S. Appl. No. 11/423,063.

Final Office Action dated Nov. 19, 2010 issued Nov. 19, 2010 in U.S. Appl. No. 11/423,053.

* cited by examiner

| Troves | built from | |
|---|---|---|
| | source | repository |
| contain  files | component | fileset |
| contain  troves | package* | group |

*packages contain only components

METHODS, SYSTEMS, AND COMPUTER PROGRAM PRODUCTS FOR PROVISIONING SOFTWARE USING LOCAL CHANGESETS THAT REPRESENT DIFFERENCES BETWEEN SOFTWARE ON A REPOSITORY AND A LOCAL SYSTEM

RELATED APPLICATION

This application claims the benefit of and priority to U.S. Provisional Patent Application No. 60/688,623, filed Jun. 8, 2005, the disclosure of which is hereby incorporated herein by reference as if set forth in its entirety.

BACKGROUND OF THE INVENTION

The present invention relates to systems and methods for software management and, more particularly, to systems, methods, and computer program products for provisioning or distributing software products, such as open source software products.

Managing and customizing open source software systems, such as the Linux operating system, has been hampered by the very heart of system maintenance: the software management system. With the current packaging systems and tools available for Linux, local changes to source code and configuration files have typically fallen into users' or administrators' hands for safekeeping, which may require manual synchronization when changes are made by the operating system distributor.

Traditional package management systems, such as the RPM package manager (RPM) and the Debian package management system (dpkg) are generally considered to provide an improvement over the previous regime of installing from source or binary tar archives. Traditional package management systems typically use simple version numbers to allow the different package versions to be sorted into "older" and "newer" packages, adding concepts, such as epochs, to work around version numbers that do not follow the packaging system's ideas of how they are ordered. While the concepts of "newer" and "older" seem simple, they may break down when multiple streams of development are maintained simultaneously using the package model. For example, a single version of a set of sources can yield different binary packages for different versions of a Linux distribution. A simple linear sorting of version numbers cannot represent this situation, as neither of those binary packages is newer than the other; the packages simply apply to different contexts.

Traditional package management systems typically provide no facilities for coordinating work between independent repositories.

Repositories may have version clashes; the same version-release string means different things in different repositories. Repositories can even have name clashes—the same name in two different repositories might not mean the same thing.

There may be no way to identify which distribution, let alone which version of the distribution, a package is intended and built for.

For example, of two packages available on the Internet, which is newer, aalib-1.4.0-5.1fc2.fr or aalib-1.4.0-0-fdr.0.8.rc5.2? One is from the freshrpms repository, and the other is from the fedora.us repository. Which package should users apply to their systems? Does it depend on which version of which distribution they have? How are the two packages related? Are they related at all? This may not be a problem in a disconnected world. However, when packages are installed from multiple sources, it can be hard to tell how to update them—or even what it means to update a package. An administrator may have to rely on memory of where a package is fetched from to look in the right repository. Once you look there, it may not be obvious which packages are intended for the particular version of the distribution you have installed. Automated tools for fetching packages from multiple repositories have increased the number of independent package repositories over the past few years, which has generally made the confusion more and more evident.

The automated tools helped exacerbate this problem (although they did not create it); they have generally not been able to solve it because the packages typically do not carry enough information to allow the automated tools to do so.

Traditional package management typically does not closely associate source code with the packages created from it. The binary package may include a hint about a filename to search for to find the source code that was used to build the package, but there generally is no formal link contained in the packages to the actual code used to build the packages. Many repositories carry only the most recent versions of packages. Therefore, even if you know which repository you got a package from, you may not be able to access the source for the binary packages you have downloaded because it may have been removed when the repository was upgraded to a new version. (Some tools help ameliorate this problem by offering to download the source code with binaries from repositories that carry the source code in a related directory, but this is only a convention and may be limited.)

Traditional package management typically does not provide a globally unique mechanism for avoiding package name, version, and release number collisions; all collision-avoidance is typically done by convention and is generally successful only when the scope is sufficiently limited. Package dependencies (as opposed to file dependencies) may suffer from this; they are generally valid only within the closed scope of a single distribution; they generally have no global validity.

It can also be difficult for users to find the right packages for their systems. Both SUSE and Fedora provide RPMs for version 1.2.8 of the iptables utility; if a user found release 101 from SUSE and thought it was a good idea to apply it to Fedora Core 2, they may break their systems.

Traditional packaging systems typically have a granular definition of architecture, not reflecting the true variety of architectures available. They typically try to reduce the possibilities to common cases (i386, i486, i586, i686, x86_64, etc.) when, in reality, there are many more variables. But to build packages for many combinations may mean storing a new version of the entire package for every combination built, and then may require the ability to differentiate between the packages and choose the right one. While some conventions have been loosely established in some user communities, many times customization has required individual users to rebuild from source code, whether they want to or not. In addition, many packaging systems build their source code in an inflexible way; it is not easy to keep local modifications to the source code while still tracking changes made to the distribution.

Traditional package management systems may allow the packager to attach arbitrary shell scripts to packages as metadata. These scripts are run in response to package actions, such as installation and removal. This approach may create problems such as the following:

Bugs in scripts are often catastrophic and may require complicated workarounds in newer versions of packages. This can arbitrarily limit the ability to revert to old versions of packages.

Most of the scripts are boilerplate that is copied from package to package. This may increase the potential for error, both from faulty transcription (introducing new errors while copying) and from transcription of faults (preserving old errors while copying).

Triggers (scripts contained in one package but run in response to an action done to a different package) may introduce levels of complexity that defy reasonable QA efforts.

Scripts may not be able to be customized to handle local system needs.

Scripts embedded in traditional packages may fail when a package written for one distribution is installed on another distribution.

SUMMARY OF THE INVENTION

In some embodiments of the present invention, software is provisioned by providing a repository that contains a software trove. A local changeset is generated that represents differences between a version of the software trove on the repository and a corresponding version of the software trove on a local system.

In still other embodiments of the present invention, the local changeset represents a difference between at least one file on the repository and at least one file on the local system.

In still other embodiments of the present invention, the local changeset represents a difference between metadata associated with at least one file on the repository and metadata associated with at least one file on the local system.

In still other embodiments of the present invention, the local system is a first local system and the method further comprises committing the local changeset to the software trove on the repository to update the version of the software trove on the repository. A version of a software trove on a second local system corresponding to the version of the software trove on the first local system is updated based on the version of the software trove of the new development branch on the repository.

In still other embodiments of the present invention, the local system is a first local system and the method further comprises communicating the local changeset to a second local system. A version of a software trove on the second local system corresponding to the version of the software trove on the first local system is updated based on the communicated local changeset.

In still other embodiments of the present invention, updating the software trove on the second local system comprises changing at least one element of the software trove on the second local system and the method further comprises updating the software trove on the second local system based on the version of the software trove on the repository while preserving the change to the at least one element of the software trove on the second local system.

In still other embodiments of the present invention, the local changeset represents addition and/or deletion of at least one file on the local system relative to the repository, and/or addition and/or deletion of metadata associated with the at least one file on the local system.

Although described above primarily with respect to method aspects of the present invention, it will be understood that the present invention may be embodied as methods, systems, and/or computer program products.

DETAILED DESCRIPTION OF EXEMPLARY EMBODIMENTS

Figure 1:
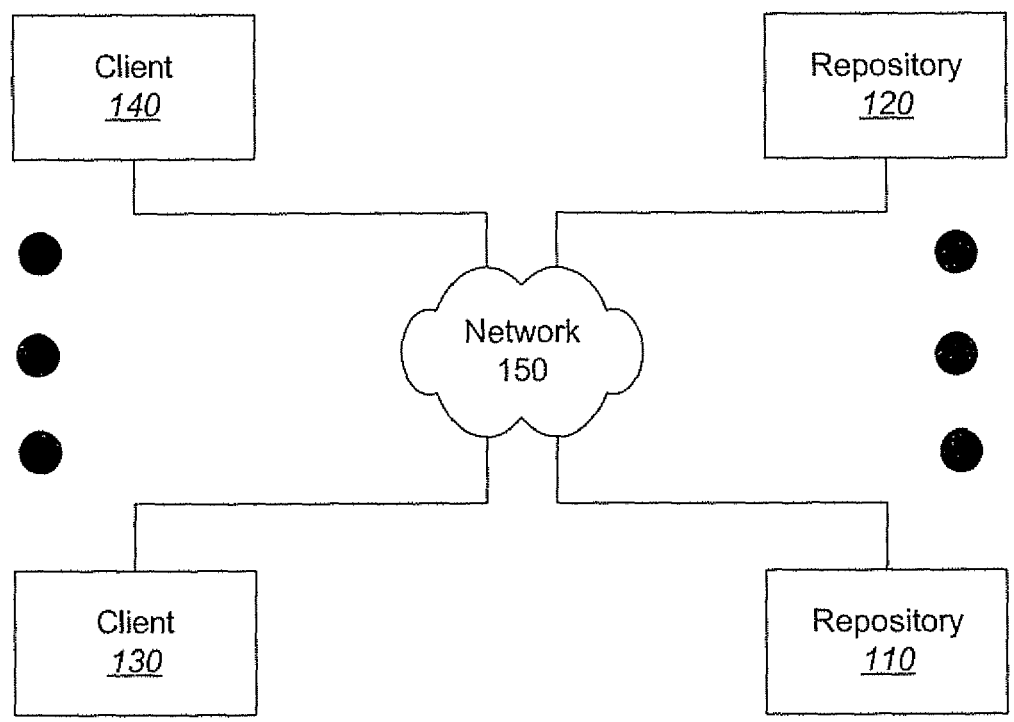
FIG. 1 is a block diagram of a communication network for provisioning software in accordance with some embodiments of the present invention.

Specific exemplary embodiments of the invention now will be described with reference to the accompanying drawings. This invention may, however, be embodied in many different forms and should not be construed as limited to the embodiments set forth wherein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a," "an," and "the" are intended to include the plural forms as well, unless expressly stated otherwise. It will be further understood that the terms "includes," "comprises," "including", and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain or store the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

The following definitions apply for the purposes of this document:

| | |
|---|---|
| package | a collection of one or more components |
| component | a collection of one or more files |
| open source software | computer software available with its source code and under an open source license to study, change, and improve its design |
| trove | a component, package, fileset, and/or group |
| fileset | a trove that contains only files that come from one or more components |
| group | a trove that contains any type of trove |

It will be understood that all troves may incorporate their contents directly and/or by reference.

Embodiments of the present invention are described herein in the context of software management/distribution for an open source software system, such as the Linux operating system. It will be understood that the present invention is not limited to open source software systems in general or the Linux operating system in particular, but may be applied to other software development projects.

Some embodiments of the present invention stem from a realization that managing and customizing some software systems, such as open source software systems, has been hampered by the provisioning and/or distribution systems that are used to manage the software. Advantageously, software provisioning systems according to some embodiments of the present invention may act as a combination of repository-based source code management and traditional package management. Users and administrators may make their local changes persistent across changes to the operating system such as upgrades, security patches, and bug fixes. Technologies such as repositories, intelligent branching, shadowing capabilities, and management based on change sets may benefit businesses, system administrators, developers, and users.

Software provisioning systems according to some embodiments of the present invention may provide a fresh approach to open source software management and provisioning. Rather than concentrating on separate package files as RPM and dpkg do, software provisioning systems according to some embodiments of the present invention may use networked repositories containing a structured version hierarchy of all the files and organized sets of files in a distribution.

This new approach may provide new features, such as the following:

Software provisioning systems according to some embodiments of the present invention may allow you to maintain and publish changes, both by allowing you to create new branches of development, and by helping track changes to existing branches of development while maintaining local changes.

Software provisioning systems according to some embodiments of the present invention may intelligently preserve local changes on installed systems. An update will not blindly obliterate changes that you have made on your local system.

Software provisioning systems according to some embodiments of the present invention can duplicate local changes made on one machine, installing those changes systematically on other machines, thereby easing provisioning of large sets of similar or identical systems.

Software provisioning systems according to some embodiments of the present invention are distinguishable from classical Linux software management tools by using a versioned repository. Where once there was a large set of package files, there is now a repository of source and binary files. The repository is a network-accessible database that contains files for applications, libraries, and other elements of the software system. In addition, the repository may maintain multiple versions of these files on multiple development branches. In some embodiments, the repository may be embodied as a disconnected model through the use of changesets, for example. In simple terms, a software provisioning system, according to some embodiments of the present invention, can be described as a packaging system that works like a source control system.

Within the repository, files are organized by grouping them first into components, which are then grouped into one or more packages. Systematic versions are used to avoid confusion. Because the packages are collections of files in a repository, the version is specified as the repository location, then the original version number (from the authors of the software), then the source revision number, then the binary build revision number when applicable. Components contain all the files needed to install the application or library, and are stored with the files themselves in a repository. This allows the applications to be "checked out" as in a source control system. Similarly, all the sources required to build components are stored in the repository using the same version system so that changes to the source can be accomplished in an environment that maintains the relationships between sources and binaries.

In addition, source code that builds more than one component is represented by only one instance in the repository. For example, if the same source code builds the application mozilla and mozilla-chat there is no duplication of the source code in the repository or on the user's machine. Also, when updating packages to new versions, only files that have actually changed in some way are updated. These behaviors may provide significant advantages in system and user resource usage as compared to traditional packaging applications.

Conventional packaging systems use simple version numbers to allow those package versions to be sorted into "older" and "newer" packages, adding concepts such as epochs to work around version numbers that do not follow the packaging system's internal model of how version numbers count. While the concepts of "newer" and "older" seem simple, they may break down when multiple streams of development are maintained simultaneously. For example, different versions of a Linux distribution include different versions of the same libraries, so the exact same source code built for different distribution versions would yield different binary packages. A simple linear sorting of version numbers simply cannot represent this situation, which quickly becomes complicated. Neither of the binary packages is newer than the other; the packages simply apply to different contexts.

Software provisioning systems according to some embodiments of the present invention may use descriptive strings to specify both the version numbers and the branch structure for any given component. The version not only provides this information but also the location of the repository (on a network), no matter if that location is external or on the local machine. Although this makes the actual version relatively long, the strings may be abbreviated into forms that closely resemble the versions other software management systems use.

In addition to the repository location being represented, there are other versioning conventions that may be used to avoid build conflicts. The numeric portion of the version contains the upstream version number followed by the source build number (how many times the sources have changed), and the binary build number (how many times this particular set of sources has been built) if applicable. These source and build numbers are specific to the repository in which they are built Two upstream versions may be compared only to see whether they are the same or different; the real meaning of the version is derived from the source build number and binary build numbers, if applicable, in relation to the branch and repository names.

Similarly, when the sources are branched, a branch label may be created to distinguish what has changed from the original sources. The branch number may be hidden from the user, as the version may be quite long at that point. However, the lengthy string may provide a well-described version that prevents version conflicts. Software provisioning systems according to some embodiments of the present invention are designed to make branching an inherent process of maintaining and customizing the system while avoiding the old version number conflicts that have affected both users and developers.

One consistent problem in the open source community is the maintenance and customization of applications and libraries that change often. With the speed of change inherent in the high-tech world, conflicts may arise when a developer or administrator creates local changes and then tries to track changing upstream development.

One way to manage local changes is to build in changes from the source code. Software provisioning systems according to some embodiments of the present invention may make this possible in two ways: One way is the simple branch, just as is done with source code control software. Unfortunately, this may not always be the best solution. If for example, a user were maintaining a version of the Linux kernel in which the user had to compile in a specific driver, the user could create a branch to add the driver, but all the work done would be relative to the kernel version that the user started with. Creating a new branch to track another version of the kernel doesn't help as the new branch will go off in its own direction like the first branch. Therefore, when a new kernel is released and committed to the repository, the only way to represent the changes in that version of the user's branch would be to manually compare the changes and apply them, bring the user's patch up to date, and commit these changes. This is time-consuming work that would have to be performed all over again whenever there is yet another new kernel release.

Software provisioning systems according to some embodiments of the present invention may provide a new concept called the shadow. A shadow may act primarily as a new layer for keeping local changes while tracking upstream changes. Shadows allow local changes to be kept distinct from the branching structure of a component being tracked; this may make it straightforward to reapply those changes to other locations in the version tree. Shadows are not designed to facilitate forking, but rather as a tool to allow local chances to track another repository. Shadows may be labeled intelligently for the maintainer's ease of use.

With shadows, maintaining the example kernel above is simply a matter of updating the shadow, modifying the local patch if necessary, and committing the new changes to the shadow. Essentially, a user is able to track the changes in the kernel while easily maintaining a patch. This maintenance and customization typically takes less work and less time than maintaining a branch, whether the task is maintaining small changes on frequently-updated components or managing a large set of changes relative to an entire operating system.

Anyone responsible for system maintenance or system configuration wants to accomplish their tasks in the simplest and safest manner. Traditional packaging systems make loading a new release of an application or library relatively easy, but do so in a "blanket" manner. When traditional systems update packages, they may not take into consideration whether the files being replaced are pristine or not. Changes are simply overwritten whether the file has been changed or not. Writing unchanged files over again may create greater overhead and may be intrusive to a well-running system. The risk is normally relatively small, but the overhead may be significant.

Just as source code control systems use patch files to describe the differences between two versions of a file, software provisioning systems according to some embodiments of the present invention may use changesets to describe the differences between versions of components. These changesets include the actual changes in contents in existing files, the contents of new files, name changes (if files are renamed but otherwise unchanged, only the change in name is included), permissions changes, and so forth. They also can include changes to components as well as to individual files.

Changesets may be transient objects; they are created as part of an operation (such as fetching a new version from a repository) and disappear when that operation has completed. They can be stored in files, however, which allows them to be distributed like the package files produced by a classical package management system. Applying changesets rather than installing whole new versions of libraries and applications may allow only the parts of the system that have changed to be updated, rather than blindly reinstalling every file.

Changesets may be more efficient than classic packages in at least two ways: they take less space to express what changes to make on the system, and they take less time to apply the changes to the system when the set of changes required is small. These benefits may apply whether the changesets are acquired through a network connection to a repository, on a CD, or other methods.

Representing updates as changesets not only saves space and bandwidth, but such an approach may also allow merging. Changes to file contents and changes file metadata, such as permissions, may be intelligently merged, in accordance with some embodiments of the present invention. This capability may be useful for maintaining a branch of an application or library while keeping current with vendor maintenance and/or while adding a couple of patches to meet local needs.

Local changes may also be preserved in essentially the same way. When, for example, a few lines are added to a configuration file on an installed system and then a new version of an application is released with changes to that configuration file, the two can be merged unless there is a direct conflict (unusual, but possible). If there is a conflict, it is marked as such so that modifications can be applied. Also, if something as simple as a file's permissions are changed, then those changes will be preserved across upgrades.

A local changeset is a special changeset that represents the changes made on a local system. There are two ways to commit local changesets: committing a local changeset to a repository, and distributing the changeset to individual systems. The first may be better for systems with entirely centralized management policies, and the latter for individual systems that are expected to autonomously update themselves asynchronously. Changesets represent an approach to preserving changes to a system while improving software system integrity and limiting resources used to make such changes. Thus, some embodiments of the present invention may improve both software system customization and maintenance.

Referring to FIG. 1, a communication network 100, in accordance with some embodiments of the present invention, comprises a first repository 110, a second repository 120, a first client 130, and a second client 140 that are coupled via network 150 as shown. The network 150 may be a global network, such as the Internet or other publicly accessible network. Various elements of the network may be interconnected by a wide area network, a local area network, an Intranet, and/or other private network, which may not accessible by the general public. Thus, the communication network 100 may represent a combination of public and private networks or a virtual private network (VPN). The first and second repositories 110 and 120 represent nodes on the network 150 that may be sources for distribution of a software system using software provisioning systems in accordance with some embodiments of the present invention. The first and second clients 130 and 140 may represent users, developers, and the like that may receive software distributions from one or more of the repositories 110 and 120. The repositories 110 and 120 may be systems that one or more clients may use to obtain software distributions. Conversely, the clients 130 and 140 may represent systems that are stand-alone and are not used to act as a source of software distribution for other clients. Although two repositories and two clients are shown in FIG. 1, it will be understood that fewer or additional repositories and/or clients may be used in accordance with various embodiments of the present invention.

As shown in FIG. 1, some embodiments according to the invention can operate in a logically separated client side/server side-computing environment, sometimes referred to hereinafter as a client/server environment. The client/server environment is a computational architecture that involves a client process (i.e., clients 130 and 140) requesting service from a server process (i.e., repositories 110 and 120). In general, the client/server environment maintains a distinction between processes, although client and server processes may operate on different machines or on the same machine. Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

The clients and servers can communicate using a standard communications mode, such as Hypertext Transport Protocol (HTTP), SOAP, and/or XML-RPC. According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client.

Although FIG. 1 illustrates an exemplary communication network, it will be understood that the present invention is not limited to such configurations, but is intended to encompass any configuration capable of carrying out the operations described herein.

Figure 2:
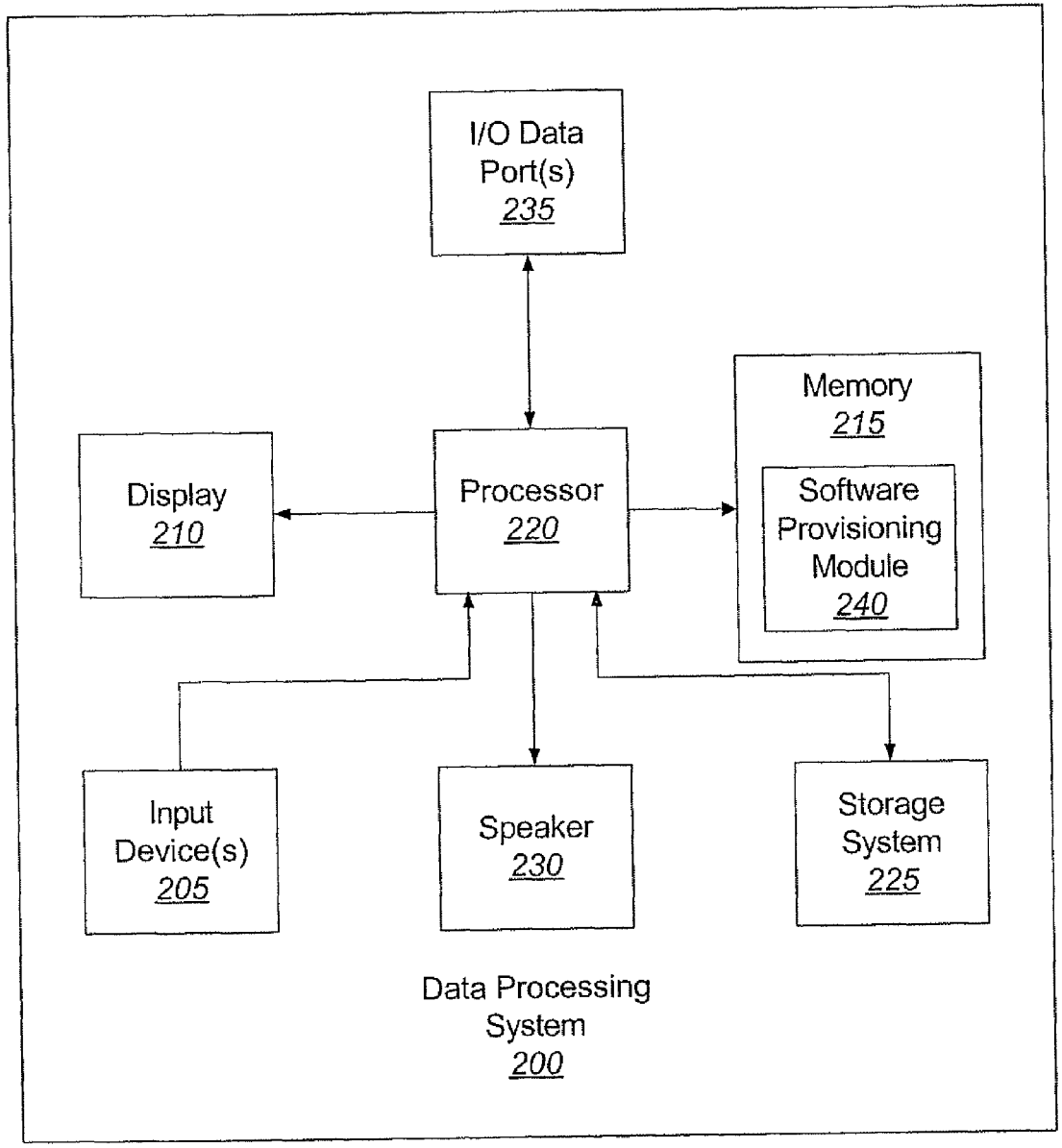
FIG. 2 is a block diagram that illustrates a data processing system in accordance with some embodiments of the present invention.

FIG. 2 illustrates a data processing system 200 that may be used, for example, to implement a repository server 110 or 120 or a client 130 or 140 of FIG. 1 and may include a module for provisioning software, in accordance with some embodiments of the present invention. The data processing system 200 comprises input device(s) 205, such as a keyboard or keypad, a display 210, and a memory 215 that communicate with a processor 220. The data processing system 200 may further comprise a storage system 225, a speaker 230, and an I/O data port(s) 235 that also communicate with the processor 220. The storage system 225 may include removable and/or fixed media, such as floppy disks, ZIP drives, hard disks, or the like as well as virtual storage such as a RAMDISK. The I/O data port(s) 235 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 215 may be configured with a software provisioning module 240 that may be used to provision and/or manage a software system.

Figure 3:
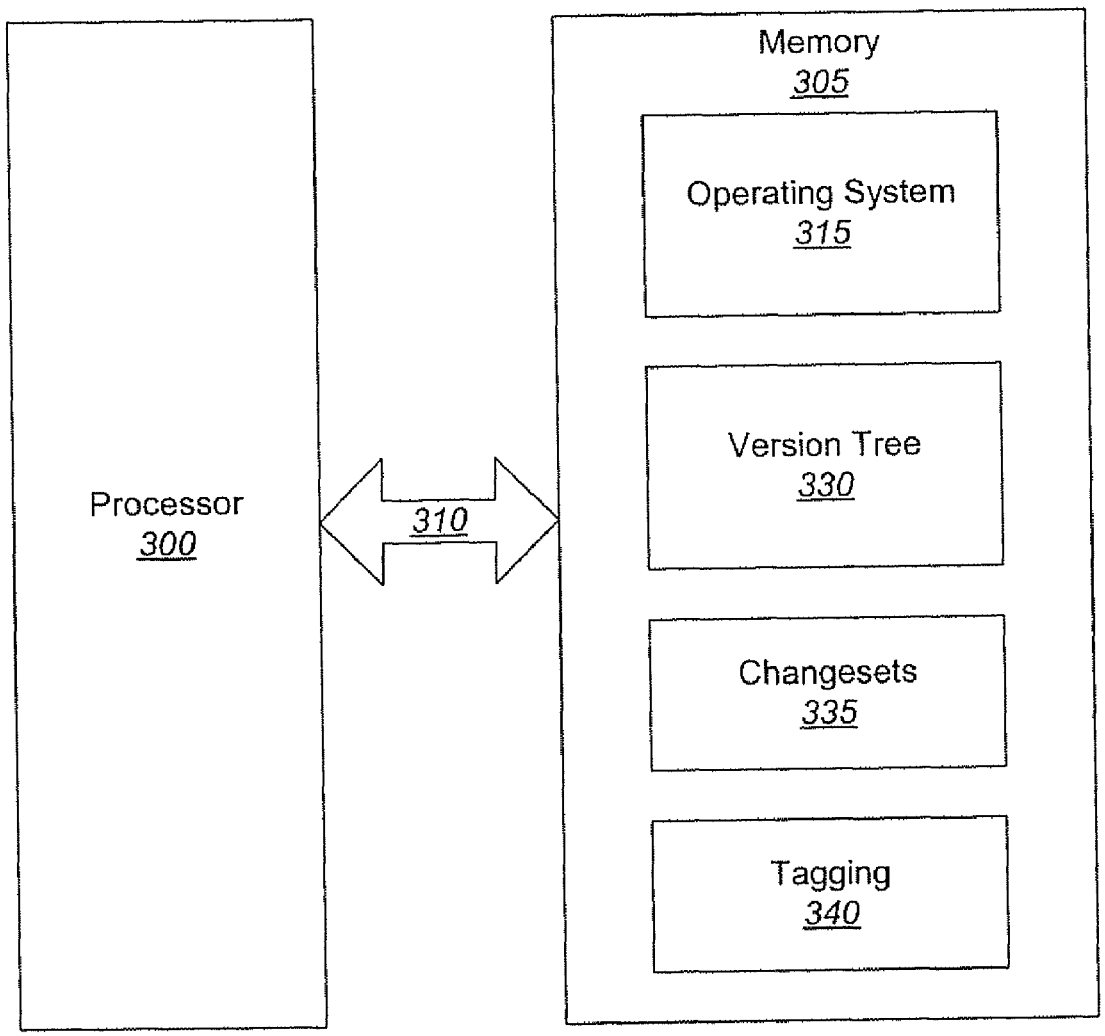
FIG. 3 is a block diagram that illustrates a software/hardware architecture for provisioning software in a data processing system in accordance with some embodiments of the present invention.

FIG. 3 illustrates a processor 300 and memory 305 that may be used in embodiments of data processing systems, such as the data processing system 200 of FIG. 2, for provisioning software in accordance with some embodiments of the present invention. The processor 300 communicates with the memory 305 via an address/data bus 310. The processor 300 may be, for example, a commercially available or custom microprocessor. The memory 305 is representative of the one or more memory devices containing the software and data used to provision software in accordance with some embodiments of the present invention. The memory 305 may include, but is not limited to, the following types of devices: cache, ROM, PROM, EPROM, EEPROM, flash, SRAM, and DRAM. As shown in FIG. 3, the memory 305 may contain up to four or more categories of software and/or data: an operating system 315, a distributed version tree module 330, a changeset module 335, and a tagging module 340. The operating system 315 generally controls the operation of the data processing system. In particular, the operating system 315 may manage the data processing system's software and/or hardware resources and may coordinate execution of programs by the processor 300. The distributed version tree module 330 may manage a software system using a structured version hierarchy of all the files in the system. Moreover, the versions are tracked using a tree structure that is similar in some aspects to a source code control system. The branches and tree structure, however, need not be kept in a single place and, advantageously, may be distributed across multiple repositories and/or clients. Thus, software provisioning systems according to some embodiments of the present invention may be particularly useful for collaborative development efforts, such as those associated with open source software systems. The changeset module 335 may be used to describe the differences between versions of troves and files. The information may include information on how files have changed as well as how the troves that reference those files have changed. The tagging module 340 may be configured to provide text tags that describe the files comprising the software system being provisioned/managed. A tag may be explicitly assigned to a file and/or a tag may be applied based on a tag description file. The tagging module may process files having a certain tag or tags associated therewith and take action on the tagged file(s).

Although FIG. 3 illustrates exemplary hardware/software architectures that may be used in data processing systems, such as the data processing system 200 of FIG. 2, for provisioning software, it will be understood that the present invention is not limited to such a configuration but is intended to encompass any configuration capable of carrying out operations described herein. Moreover, the functionality of the data processing system 200 of FIG. 2 and the hardware/software architecture of FIG. 3 may be implemented as a single processor system, a multi-processor system, or even a network of stand-alone computer systems, in accordance with various embodiments of the present invention.

Computer program code for carrying out operations of data processing systems discussed above with respect to FIG. 3 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The architecture and operations associated with some embodiments of the distributed version tree module 330, the changeset module 335, and the tagging module 340 will now be described.

Distributed Version Tree

Figure 4:
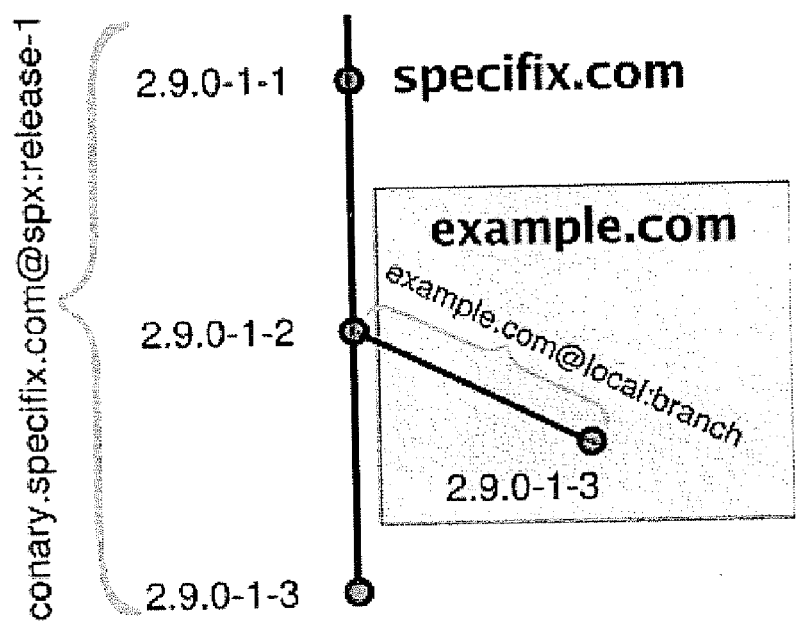
FIG. 4 is a diagram that illustrates distributed branches in accordance with some embodiments of the present invention.

Software provisioning systems according to some embodiments of the present invention may keep track of versions in a tree structure, similar to a source code control system. One difference between software provisioning systems according to some embodiments of the present invention and many source code control systems is that embodiments of the present invention do not need all the branches of a tree to be kept in a single place. For example, if specifix maintains a kernel at specifix.com, and a user, working for example.com, wants to maintain a branch from that kernel, the user's branch could be stored on the user's machines, with the root of that branch connected to the tree stored on rpath's machines as shown in FIG. 4.

Software provisioning systems according to some embodiments of the present invention may store everything in a distributed repository, instead of in package files. The repository is a network-accessible database that contains files for multiple packages, and multiple versions of these packages, on multiple development branches. Typically, nothing is ever removed from the repository once it has been added.

When a file is stored in the repository, it is tracked by a unique file identifier rather than by name. Among other things, this may allow changes to file names to be tracked—the file name is merely one piece of metadata associated with the file, just like the ownership, permission, timestamp, and contents. If the repository is thought of as a filesystem, then the file identifier is like an inode number.

When software is built, software provisioning systems according to some embodiments of the present invention may collect the files into components, and then collects the components into one or more packages. Components and packages are both called troves. A trove is (generically) a collection of files or other troves.

A package does not directly contain files; a package references components, and the components reference files. Every component's name is constructed from the name of its container package, a character, and a suffix describing the component. Several standard component suffixes may be used, such as source, :runtime, :devel, :docs, and so forth. Files may be automatically assigned to components during the build process, but the assignments may be overruled and arbitrary component suffixes created as appropriate.

Figure 5:
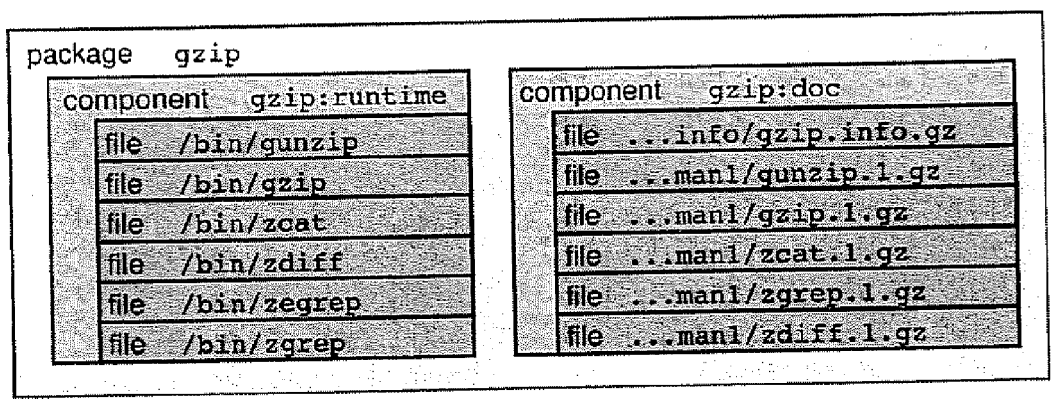
FIG. 5 is a diagram that illustrates an exemplary package structure in accordance with some embodiments of the present invention.

One component, with the suffix :source, holds all source files (archives, patches, and build instructions); the other components hold files to be installed. The source component is not included in any package. Management of source files and binary files are unrelated activities performed with different tools; for example, there is not a one-to-one relationship between source checkins and binary builds. Several different packages can be built from the same source component. For example, the mozilla:source component builds the packages mozilla, mozilla-mail, mozilla-chat, and so forth. The version structure in the repositories may tell exactly which source component was used to build any other component. FIG. 5 illustrates collections of files into two components gzip:runtime and gzip:doc and the association of these two components with a package gzip.

Strongly descriptive strings may be used to compose the version and branch structure. The amount of description may make them quite long, so as much of the string as possible may be hidden for normal use. Version strings may act somewhat like domain names in that for normal use you need only a short portion. For example, the version /conary.rpath.com@rpl:trunk2.2.3-4-2 can usually be referred to and displayed as 2.2.3-4-2. The entire version string uniquely identifies both the source of a package and its intended context. These longer names are globally unique, which may reduce confusion. Let's dissect the version string /conary.rpath.com@rpl:trunk/2.2.3-4-2. The first part, conary.rpath.com@rpl:trunk, is a label. The label holds:

The repository identifier that is unique within a domain of use: conary.rpath.com Branch name: rpl:trunk Namespace: rpl A high-level context specifier that allows branch names to be reused by independent groups. A registry of namespace identifiers may be maintained to prevent conflicts. Use local for branches that will never need to be shared with other organizations.

Tag: trunk This is the only portion of the label that is essentially arbitrary; and will be defined by the owner of the namespace it is part of.

The next part, 2.2.3-4-2, is called the revision and contains the more traditional version information.

Upstream version string: 2.2.3 This is the version number or string assigned by the upstream maintainer. A check is made to determine whether this upstream version exists already (to see which source count to use; see below), that it starts with a numeric character (to distinguish versions from labels when abbreviating versions), and that the—character is not in it (because the—character seperates the upstream version string from the next data element). The upstream version string is there primarily to present useful information to the user. Software provisioning systems according to some embodiments of the present invention never try to determine whether one upstream version is "newer" or "older" than another. Instead, the ordering specified by the repository's version tree determines what the software provisioning system thinks is older or newer; the most recent commit to the branch is the newest.

Source count: 4 Incremented each time a version of the sources with the same upstream version string is checked in. It is similar to the release number used by traditional packaging systems.

Build count: 2 How many times the source component that this component comes from has been built. This number is not provided for source components, because it is meaningless in that context.

Figure 6:
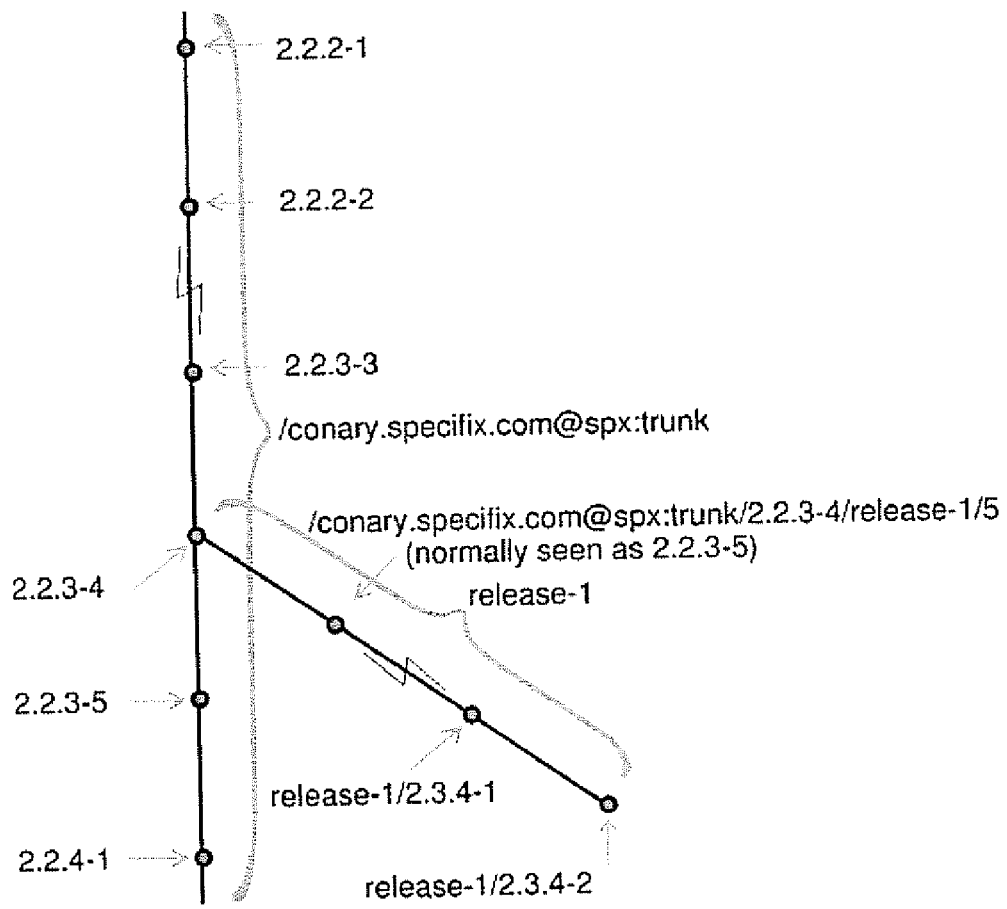
FIG. 6 is a diagram that illustrates branch affinity in accordance with some embodiments of the present invention.
Figure 7:
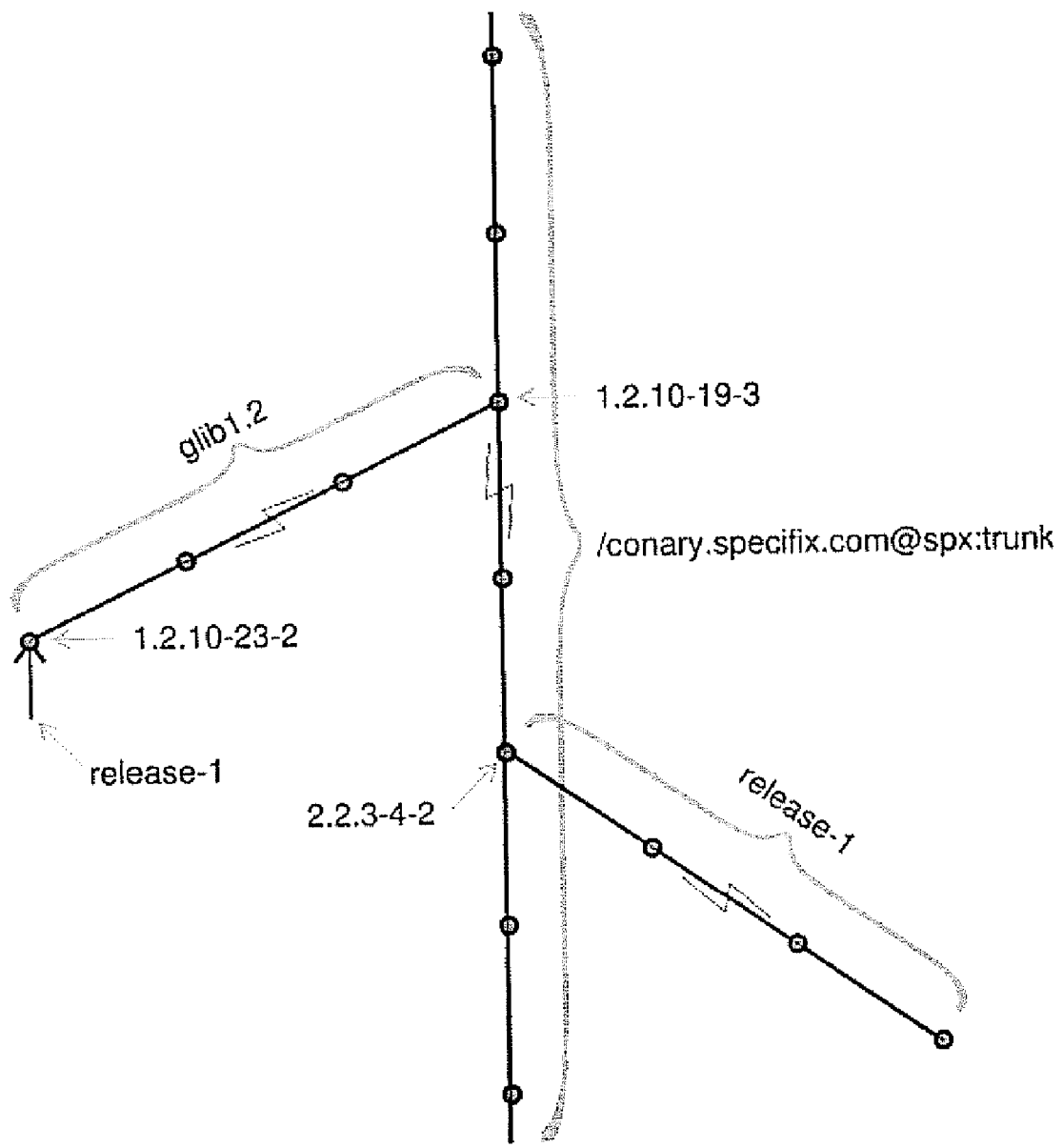
FIG. 7 is a diagram that illustrates label addressing in accordance with some embodiments of the present invention.

A branch structure is described by appending version strings, separated by a / character. Referring now to FIG. 6, the first step to make a release is to create a branch that specifies what is in the release. Create the release-1 branch off the trunk: /conary.rpath.com@spx:trunk2.2.3-4/release-1 (note that because we are branching the source, there is no build count).

In this branch, release-1 is a label. The label inherits the repository and namespace of the node it branches from; in this case, the full label is conary.specifix.com@spx:release-1 The first change that is committed to this branch can be specified in somewhat shortened form as /conary.specific.com@spx: trunk/2.2.3-4/release-1/5. Because the upstream version is the same as the node from which the branch descends, the upstream version may be omitted, and only the software provisioning system version provided. Users will normally see this version expressed as 2.2.3-5, so this string, still long even when it has been shortened by elision, will not degrade the user experience.

When a user wishes to install a new trove on a client system, but does not specify exactly which version to install, software provisioning systems in accordance with some embodiments of the present invention will search its installLabelPath, which is just an ordered list of labels, to find the trove. However, once a trove is installed on the system, from any branch, updates to that trove will come from that branch. This is called branch affinity. For example, assume that gimp 2.2.2 is in the distribution, and that the distribution label (conary.rpath.com@rpl:release1) is first in the installLabelPath, then conary update gimp will get gimp 2.2.2. However, suppose that someone is building the development version of gimp into a "contrib" repository on a branch named /conary.rpath.com@rpl:something/contrib.rpath.com@rpl: gimpdevel, which has the label contrib.rpath.com@rpl:gimpdevel. One then may run conary update gimp=contrib.rpath.com@rpl:gimpdevel to get the development version of gimp. Then, even if gimp 2.2.3 was later built into the distribution repository, future instances of conary update gimp would continue to fetch the latest version of the gimp from /conary.rpath.com@rpl:something/contrib.rpath.com@rpl.gimpdevel—that is, the exact branch that the label contrib.rpath.com@rpl:gimpdevel specified at the time when the user originally updated to that label. The software provisioning system may be asked to return to the stable version with conary update gimp=conary.rpath.com@rpl:release1.

One way to manage local changes is to build changes from source code. Software provisioning systems according to some embodiments of the present invention may make this possible in two ways: One way is a simple branch, similar to what is done with source code control software. Unfortunately, this may not always the best solution.

Imagine a stock 2.6 Linux kernel being maintained on the /linux26 branch (we have omitted the repository unique identifier and namespace identifier from the label for brevity) of the kernel:source package, currently at version 2.6.5-1 (note that because it is a source package, there is no build count). A user has one patch to add relative to that version, and then the user wishes to track that maintenance branch, keeping the change up to date with the maintenance branch, and building new versions with time.

If you create a new branch from /linux26/2.6.5-1, say /linux26/2.6.5-1/mybranch, all the work you do is relative to that one version. Creating a new branch does not help because the new branch goes off in its own direction from one point in development, rather than tracking changes. Therefore, when the new version /linux26/2.6.6-1 is committed to the repository, the only way to represent that version in the user's branch would be to manually compare the changes and apply them all, bring the patch up to date, and commit the changes to the user's branch. This may be time-consuming, and the branch structure does not represent what is really happening in that case.

Note that a user does not want to re-branch and create /linux26/2.6.6-1/mybranch because then mybranch will now be a label that means both /linux26/2.6.5-1/mybranch and /linux26/2.6.6-1/mybranch—almost certainly not what is intended. This would make it necessary to specify the entire branch name (/linux26/2.6.6-1/mybranch instead of just mybranch) when installing.

Software provisioning systems according to some embodiments of the present invention use a new concept called a shadow. A shadow may act primarily as a repository for local changes to a tree. A shadow may track changes relative to a particular upstream version string and source count, and is designed to allow a user to merge changes and follow development. The name of a shadow is the name of the parent branch with //shadowname appended; for example, /branch// shadow. (Note that /branch may actually be something like /conary.rpath.com@rpl:linux and //shadow may actually be something like //conary.example.com@rpl:myshadow)

Both /branch/1.2.3-3 and /branch//shadow/1.2.3-3 refer to exactly the same contents. Changes are represented with a dotted source count, so the first change to /branch/1.2.3-3 that is checked in on the /branch//shadow shadow will be called /branch//shadow/1.2.3-3.1. When binaries are built, the result have versions like /branch//shadow/1.2.3-3.1-1.1 where the build count has also been dotted.

If a user updates to a new upstream source version on the shadow without merging to the parent branch, "0" is used as a placeholder for the parent source count. So if a user checks in version 1.2.4 on this shadow, the user will get /branch// shadow/1.2.4-0.1 as the version. The same thing happens for build count; if the source version /branch/1.2.4-1 exists, but the build version /branch/1.2.4-1-1 does not exist when the user builds on the user's shadow, the user will get versions that look like /branch//shadow/1.2.4-1.1-0.1. Thus, the dotted counts are an indication of how many levels of shadows have been created from a head or trunk. Advantageously, embodiments of the present invention may allow shadows to be created to an arbitrary depth, i.e., multiple shadows can be created from a head, trunk, branch, and/or shadow. As discussed above, a component of source or binary count of [0] implies that there is no source to reference at that parent level. For example, a version of 1.0-1-0.1 means that a shadow was created of an existing version 1.0 on the parent branch, but the binaries built from that shadow do not reference binaries built on the parent. Similarly, a version of 1.0-0.1-1 means that a shadow has been created from some version other than 1.0 on the parent branch, that the version was changed without reference to a 1.0 version on the parent branch (irrespective of whether a 1.0 version exists at any point in time on the parent branch), and that was then built without reference to the parent branch. Finally, as shadows get deeper, the version string, may include multiple dots. For example, a shadow of a shadow of a shadow of a head or trunk may have the following version string: 1.0-0.1.2.3-1.

It will be understood that, as used herein, the term "source" does not necessarily refer to software files that are uncompiled and the terms "binary" or "built file" do not necessarily refer to software files that have been compiled into executable files or object files. Instead, "source" generally refers to a desired format for distribution of files and binary or "built file(s)" generally refer to a desired format for installation of files on a system. Thus, software files that have been compiled may be considered "source" or "binary" depending on the context. Similarly, software files that have not been compiled may also be considered "source" or "binary" depending on the context. Other files, such as metadata, make files, readme files, and the like may also be considered "source" or "binary" files depending on the distribution context.

So, to track changes to the /linux26 branch of the kernel: source package, a user may create the mypatch shadow of the /linux26 branch, /linux26//mypatch, and therefore /linux26//mypatch/2.6.5-1 now exists. Commit a patch to the shadow, and /linux26//mypatch/2.6.5-1.1 exists. Later, when the linux26 branch is updated to version 2.6.6-1, a user merely needs to update the shadow, modify the patch to apply to the new kernel source code if necessary, and commit the new changes to the shadow, where they will be named /linux26//mypatch/2.6.6-1.1. The shadow branch name /linux26//mypatch can be used just like the branch name /linux26 is used; that branch can be installed, and conary update will use the same rules to find the latest version on the shadow that it uses to find the latest version on the branch. This includes affinity; software provisioning systems according to some embodiments of the present invention will look at the latest version on the shadow that you have installed; it will not switch to a different branch, nor will it look up the tree and pick a version off the branch (or shadow) from which the shadow was created.

Because re-branching (creating the same branch name again starting from a different root) creates multiple instances of labels, one for each branch instance, you really only want to use branches for truly divergent development, where there is no possibility at all that you will ever want to synchronize the branch with its parent. The main use for branches is to keep one or more old versions of a library (or less commonly, an application) available for the sake of compatibility, while moving forward with the more recent version; for example, gtk 1.2 and gtk 2. Unless you explicitly want to automatically install two versions at the same time (due to labels applying to both branches), a shadow is preferred instead of a branch. Shadows do not require that the user ever merge or re-shadow; they do keep that option open in case it is ever useful. A branch is typically used only for divergent development. In case of any doubt, a shadow is preferred because shadows will also work for divergent developments as long as a user does not want to automatically install both branches at once.

Software provisioning systems according to some embodiments of the present invention may have a unified approach to handling multiple architectures and modified configurations. Architectures are viewed as an instruction set, including settings for optional capabilities. Configuration is set with system-wide flags. Each separate architecture/configuration combination built is called a flavor.

Using flavors, the same source package can be built multiple times with different architecture and configuration settings. For example, it could be built once for x86 with i686 and SSE2 enabled, and once for x86 with i686 enabled but SSE2 disabled. Each of those architecture builds could be done twice, once with PAM enabled, and once with PAM disabled. All these versions, built from exactly the same sources, are stored together in the repository. At install time, the software provisioning system may pick most appropriate flavor of a component to install for the local machine and configuration (unless the automated choice is overidden). Furthermore, if two flavors of a component do not have overlapping files, and both are compatible with the local machine and configuration, both can be installed. For example, library files for the i386 family are kept in /lib and /usr/lib, but for x86_64 they are kept in /lib64 and /usr/lib64, so there is no reason that they should not both be installed, and because the AMD64 platform can run both, it is convenient to have them both installed. When a trove is updated, flavor affinity is applied—that is, the software provisioning system tries to pick (from the available flavors of the latest version of that trove) the flavor that most closely matches what is currently installed that is compatible with the system. Like branch affinity, flavor affinity can also be overridden.

Changesets

Similar to the way that source code control systems use patch files to describe the differences between two versions of a file, software provisioning systems according to some embodiments of the present invention may use changesets to describe the differences between versions of troves and files. These changesets include information on how files have changed, as well as how the troves that reference those files have changed.

These changesets are often transient objects; they are created as part of an operation and disappear when that operation has completed. They can also be stored in files, however, which allows them to be distributed like the packages produced by a classical package management system.

Applying changesets rather than installing new versions of packages allows only the parts of a package that have changed to be updated, rather than blindly reinstalling every file in the package. Besides saving space and bandwidth, representing updates as changes has another advantage: it allows merging. Changes not only to file contents, but also to file metadata such as permissions, may be intelligently merged. This capability may be useful if a user wishes to maintain a branch or shadow of a package—for example, keeping current with vendor maintenance of a package, while adding a couple of patches to meet local needs. Local changes may also be tracked in essentially the same way, thereby preserving them.

When, for example, a few lines are added to a configuration file on an installed system, and then a new version of a package is released with changes to that configuration file, the two can be merged unless there is a direct conflict (unusual but possible). If a file's permission bits are changed, then those changes will be preserved across upgrades.

Two types of change sets are supported.

The differences between two versions in a repository

The complete contents of a version in a repository (logically, this is the difference between nothing at all and that version)

In the first case, where the software provisioning system is calculating the differences between two different versions, the result is a relative changeset. In the second case, where the software provisioning system is encoding the entire content of the version, the result is an absolute changeset. (If a user uses an absolute changeset to upgrade to the version provided in the absolute changeset, the software provisioning system internally converts the changeset to a relative changeset, thereby preserving the local changes.) Absolute changesets are convenient ways of distributing versions of troves and files to users who have various versions of those items already installed on their systems. In practice, they can be distributed just like package files created by traditional package management systems.

Many things can be done with one of these changesets: The software provisioning system can update a system, either directly from a changeset file, or by asking the repository to provide a changeset and then applying that changeset. The software provisioning system can also store existing changesets in a repository. This capability may be used to provide repository mirroring, and it can also be used to move changes from one repository to a branch in a different repository. Changesets may also be used to create and maintain branches, shadows, and clones.

Software provisioning systems according to some embodiments of the present invention can also generate a local changeset that is a relative changeset showing the difference between the repository and the local system for the version of a trove that is installed. A local changeset can be distributed to another machine in two ways:

A user can distribute it to other machines with the same version of the trove in question installed.

A user can commit the local changeset to a branch of a repository, and then update to that branch on target machines.

There is an important distinction between the two cases. In the first case, the machine that applies the changeset will act as if those changes had been made by the system's administrator; because those changes are not in a repository they are not versioned. In the second case, however, the machine gets those changes by updating the trove to the branch that contains those changes, and it can continue to track changes from that branch. For example, assume that there are machines with troves from branches labeled conary.rpath.com@rpl:rel1 installed, and there are some local changes to distribute to a group of machines. After updating to version 2.9.0-1-2 of tmpwatch, a user wants to change the permissions of the /usr/sbin/tmpwatch binary:chmod 100 /usr/sbin/tmpwatch. Now, the user records that change in a local changeset; that changeset is relative to 2.9.0-1-2, and describes the local changes.

Figures 8, 9:
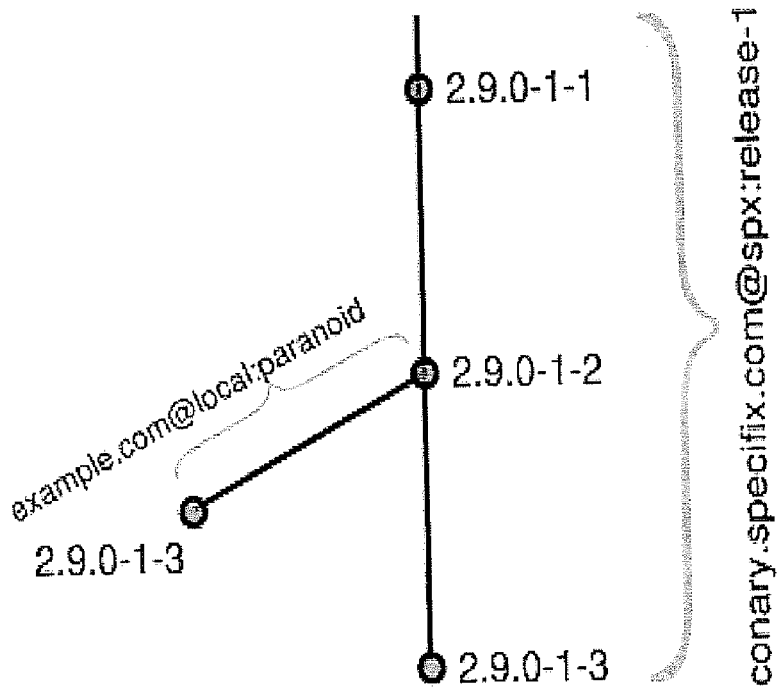
FIG. 8 is a diagram that illustrates local changesets in accordance with some embodiments of the present invention.
FIG. 9 is a diagram that illustrates four kinds of troves in accordance with some embodiments of the present invention.

The user then commits the local changeset to the conary.example.com@local:paranoid branch in the local repository as shown in FIG. 8. Now, on all the machines in the group, the user can update tmpwatch conary.example.com@local:paranoid. Each machine will now look in the conary.example.com repository on the paranoid branch by simply running conary update tmpwatch. This means that if a user makes further changes to the tmpwatch package, the user can commit those changes to the paranoid branch on the conary.example.com repository, and each of the machines will update to the latest version that the user has committed to that branch. When a new version of tmpwatch is released on the conary.rpath.com@rpl:rel1 branch, a user may apply the changeset to the conary.example.com@local: paranoid branch before the machines with the paranoid branch installed will update their copies of tmpwatch.

If rather than maintaining a branch, a user merely wants to distribute some changes that are local to a group of machines, then the user does not want to commit the local changeset to a repository. Instead, a user may copy the changeset file (call it paranoid.ccs) to each client machine and run conary localcommit paranoid.ccs on each machine. Now, the change to permissions applies to each system, but canary update tmpwatch will still look at conary.rpath.com@rpl:rel1 and a software provisioning system according to some embodiments of the present invention will apply updates to tmpwatch from conary.rpath.com@rpt:rel1 without additional work required on the user's part, and it will preserve the change to the permissions of the /usr/sbin/tmpwatch binary on each machine.

Both ways of manager local change may be useful. Committing local changesets to a repository may be useful for systems with a centralized management policy, where system changes are cleared by some central agency, whereas distributing local changesets may be useful when individual systems are expected to autonomously update themselves asynchronously.

When a software system is updated, a software provisioning system according to some embodiments of the present invention does not blindly obliterate all changes that have been made on the local system. Instead, it does a three-way merge between the currently installed version of a file as originally installed, that file on the local system, and the version of the file being installed. If an attribute of the file was not changed on the local system, that attribute's value is set from the new version of the package. Similarly, if the attribute did not change between versions of the package, the attribute from the local system is preserved. Conflicts may occur if both the new value and the local value of the attribute have changed; in that case a warning is given and the administrator needs to resolve the conflict. For configuration files, context diffs are created and applied. This preserves changes using the widely-understood diff/patch process.

Software provisioning systems according to some embodiments of the present invention may be more efficient than traditional packaging systems in several ways.

By utilizing relative changesets when possible, less bandwidth may be used.

By modifying only changed files on updates, less time may be used to do updates, particularly for large packages with small changes.

By using a versioned repository, space may be saved because unchanged files are stored once for the whole repository, instead of once in each version of each package.

By enabling distributed repositories, software provisioning systems according to some embodiments of the present invention save the time it takes to maintain a modified copy of an entire repository, and save the space it takes to store complete copies of an entire repository.

Because software provisioning systems according to some embodiments of the present invention may update systems by applying changesets, and because changes may be followed on the local system intrinsically, rollbacks may be supported. If requested, an inverse changeset can be stored that represents each transaction (a set of trove updates that maintains system consistency, including any dependencies) that is committed to the local system. If the update creates or causes problems, an administrator can install the changeset that represents the rollback.

Because rollbacks can affect each other, they may be strictly stacked; a user can (in effect) go backward through time, but cannot browse. The most recent rollback must be applied before applying the next most recent rollback, and so forth. This might seem like a great inconvenience, but it is not. Because local changes are maintained vigorously, including merging changes to configuration files, and because all the old versions that might have been installed before are still in the repositories they came from, a user can "update" to older versions of troves and get practically the same effect as rolling back the upgrade from that older version.

Applying rollbacks can be more convenient when a user wants to roll back the previous few transactions and restore the system to the state it was in, say, two hours ago. However, if a user wants to be selective, "upgrading" to an older version may be more convenient than it would be to try to select a rollback transaction that contains the desired change.

Tagging

In place of the script metadata provided by traditional package management systems, software provisioning systems according to some embodiments of the present invention may use a concept called dynamic tags. Managed files can have sets of arbitrary text tags that describe them. Some of these tags are defined by the software provisioning system (for example, shub is reserved to describe shared library files that cause an update to /etc/ld.so.conf and run ldconfig), and others can be more arbitrary. To allow tag semantics to be shared between repositories, a global tag registry may be hosted.

By convention, a tag is a noun or noun phrase describing the file; it is not a description of what to do to the file. That is, file is—a tag. For example, a shared library is tagged as shlib instead of as ldconFIG. Similarly, an info file is tagged as info-file, not as install-info.

Software provisioning systems according to some embodiments of the present invention can be explicitly directed to apply a tag to a file, and can also automatically apply tags to files based on a tag description file. A tag description file may provide the name of the tag, a set of regular expressions that determine which files the tag applies to, the path of the tag handler program that is run to process changes involving tagged files, and a list of actions that the handler cares about. The handler may then be called at appropriate times to handle the changes involving the tagged files.

Actions include changes involving either the tagged files or the tag handlers. Lists of affected files may be passed in whenever it makes sense, and will coalesce actions rather than running all possible actions once for every file or component installed. Possible actions include:

Tagged files have been installed or updated; the software provisioning system provides a list of all installed or updated tagged files.

Tagged files are going to be removed; the software provisioning system provides a list of all tagged files to be removed.

Tagged files have been removed; the software provisioning system provides a list of filenames that were removed.

The tag handler or tag description have been installed or updated; the software provisioning system provides a list of all tagged files already installed on the system.

The tag handler or tag description will be removed; the software provisioning system provides a list of all the tagged files already installed on the system to facilitate cleanup.

Before an installation is performed, the tag handler may be run to provide a list of all tagged files installed on the system.

Because the tag description files list the actions they handle, the tag handler API can be expanded relatively easily while maintaining backward compatibility with old handlers. Avoiding duplication between packages by writing scripts once instead of many times may reduce bugs in scripts. Practically speaking, it may avoid whole classes of common bugs that cause package upgrades to break installed software, and even more importantly from a provisioning standpoint, bugs that would cause rollbacks to fail. It may be easier to fix bugs when they do occur, without any need for "trigger" scripts that are often needed to work around script bugs in traditional package management. It also may allow components to be installed across distributions as long as they agree on the semantics for the tags, the actions taken for any particular tag will be correct for the distribution on which the package is being installed.

Calling tag handlers when they have been updated may make recovery from bugs in older versions of tag handlers relatively benign; only a single new tag handler may need to be installed with the capability to recover from the effects of the bug. Older versions of packages with tagged files may use the new, fixed tag handler, which may allow a user to revert those packages to older versions as desired, without fear of re-introducing bugs created by old versions of scripts. Furthermore, storing the scripts as files in the filesystem instead of as metadata in a package database means:

they can be modified to suit local system peculiarities, and those modifications will be tracked just like other configuration file modifications;

they are easier for system administrators to inspect; and they are more readily available for system administrators to use for custom tasks.

Note that there is nothing that says that taghandler scripts have to be shell scripts. Software provisioning systems in accordance with some embodiments of the present invention may be written in a scripting language, such as Python. Writing taghandler scripts in Python will not implicitly add dependencies. They could be written in other scripting languages; a user should be aware of the dependencies that are added to the system by doing so. It will be understood that taghandler scripts are separate program modules by design in accordance with some embodiments of the present invention. Thus, different types of programming languages may be used to implement the taghandler scripts in accordance with various embodiments of the present invention.

There are two other kinds of troves that have not yet been discussed: groups and filesets. Filesets are troves that contain only files, but those files come from components in the repository. They allow custom re-arrangements of any set of files in the repository. (They have no analog at all in the classical package model.) Each fileset's name is prefixed with fileset-, and that prefix is reserved for filesets only.

Filesets may be useful for creating small embedded systems. With traditional packaging systems, a user is typically limited to installing a system, then creating an archive containing only the files the user wants; this may limit the options for upgrading the system. In accordance with some embodiments of the present invention, a user can instead create a fileset that references the files, and the user can then update that fileset whenever the components on which it is based are updated, and even update very thin embedded images. The desire to be able to create working filesets was a motive for using file-specific metadata instead of trove-specific metadata wherever possible. For example, files in filesets maintain their tags, which means that exactly the right actions will be taken for the fileset.

Groups are troves that contain any other kind of trove, and the troves are found in the repository. Each group's name is prefixed with group-, and that prefix is reserved for groups only. Groups may be useful when you want to create a group of components that should be versioned and managed together. Groups are versioned like any trove, including packages and components. Also, a group references only specific versions of troves. Therefore, if a user installs a precise version of a group, then the user knows exactly which versions of the included components are installed; if a user updates a group, the user knows exactly which versions of the included components have been updated.

If a user has a group installed and then erases a component of the group without changing the group itself, the local changeset for the group will show the removal of that component from the group. This may make groups a powerful mechanism administrators can use to easily browse the state of installed systems. The relationship between all four kinds of troves is illustrated in FIG. 9.

Groups and filesets are built from :source components just like packages. The contents of a group or fileset is specified as plain text in a source file; then the group or fileset is built just like a package.

This means that groups and filesets can be branched and shadowed just like packages can. So if a user has a local branch with only one modified package on it, and then the user wants to create a branch of the whole distribution containing your package, the user can branch the group that represents the whole distribution, changing only one line to point to the locally changed file. You do not have to have a full local branch of any of the other packages or components.

Furthermore, when the distribution from which the user has branched is updated, the modification to the group can follow the updates, so the user can keep the distribution in sync without having to copy all the packages and components.

The present invention is described hereinafter with reference to flowchart and/or block diagram illustrations of communication networks, methods, and computer program products in accordance with some embodiments of the invention. These flowchart and/or block diagrams further illustrate exemplary operations of the software provisioning system architectures of FIGS. 1-3. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Operations begin at block 1000 where a file repository is provided that includes a software trove. The file repository may be thought of as a system where one or more local client systems may turn to obtain new and/or updated versions of a software product. As discussed above, in accordance with various embodiments of the present invention, the file repository may support multiple branches, which may reside on a single repository system or multiple repository systems. In this regard, a user may choose to install the version of the software trove from the file repository on a local system where one or more files may be modified locally. At block 1005, a local changeset may be generated that represents differences between the version of the software trove on the file repository and the version of the software trove on the local system. Note that the changeset may represent changes to the contents of one or more files and/or metadata, such as permissions or the like, that are associated with the file(s). The local changeset may also represent addition and/or deletion of one or more files on the local system relative to the repository, and/or addition and/or deletion of metadata associated with one or more files on the local system.

Figure 11:
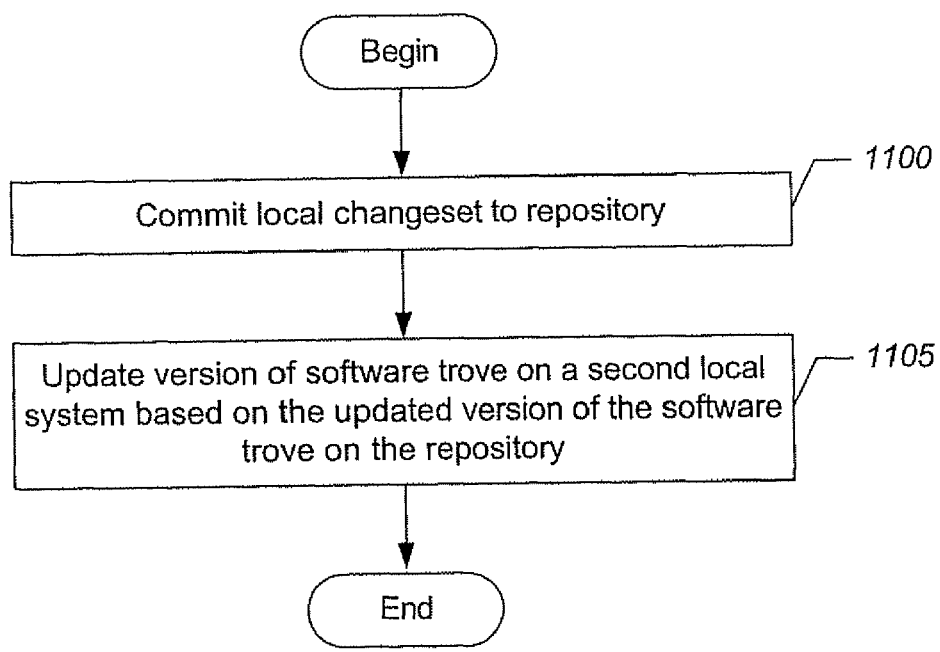

As illustrated in FIG. 11, the local changeset may be shared with other users in different ways in accordance with various embodiments of the present invention. One approach is to commit the local changeset to the software trove on the repository at block 1100 to update the version of the software trove on the repository with the local changes/modifications made on the local system. At block 1105, another local system may then update their software trove by performing an installation and/or an update from the updated version of the software trove on the repository. In this way, development taking place on the first local system may be shared with others who have access to the main distribution repository.

Figure 12:
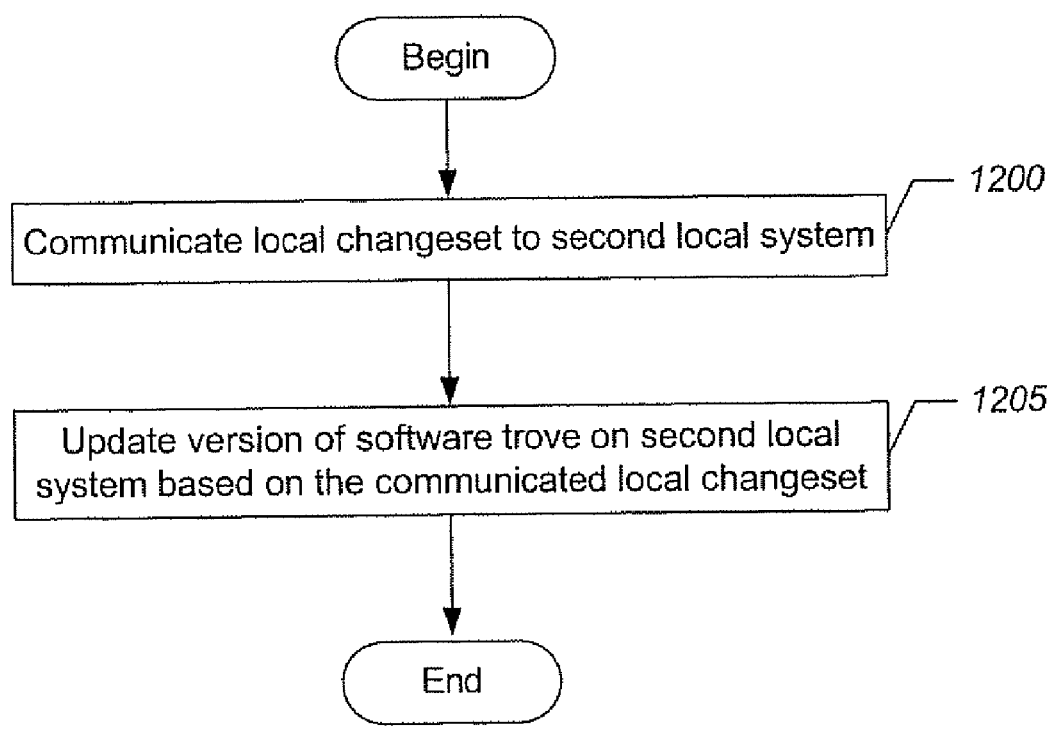

FIG. 12 illustrates another approach to distributing changes to a software trove that have been made on a local system. In these embodiments, the local changeset generated on a first local system may be communicated to one or more other local systems directly without committing the local changeset to file repository at block 1200. The other local systems may then apply the local changeset received from the first local system to update/install the file changes associated with the software trove version on the first local system at block 1205.

Advantageously, if one or more of the other local systems chooses to obtain an update from the file repository for the software trove associated with the local changeset obtained from the first local system, the file(s) or elements of the software trove that were affected by the applied local changeset may be preserved when obtaining an update from the file repository.

Figure 10:
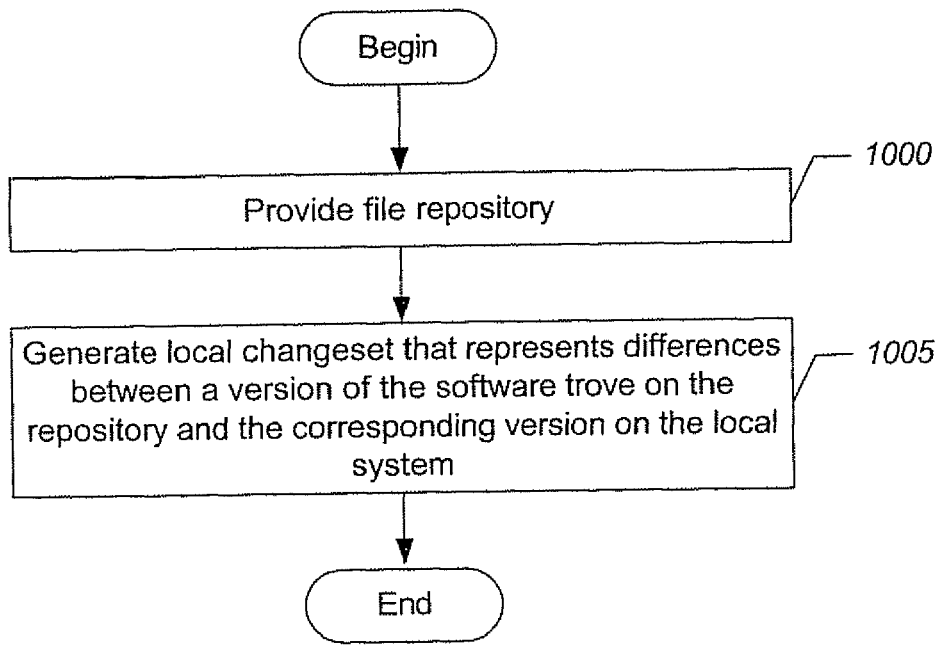
FIGS. 10-12 are flowcharts that illustrate operations for provisioning software in accordance with some embodiments of the present invention.

The flowchart of FIGS. 10-12 illustrate the architecture, functionality, and operations of embodiments of software provisioning systems hardware and/or software. In this regard, each block represents a module, segment, or portion of code, which comprises one or more executable instructions for implementing the specified logical function(s). It should also be noted that in other implementations, the function(s) noted in the blocks may occur out of the order noted in FIGS. 10-12. For example, two blocks shown in succession may, in fact, be executed substantially concurrently or the blocks may sometimes be executed in the reverse order, depending on the functionality involved.

In the drawings and specification, there have been disclosed exemplary embodiments of the invention. Although specific terms are used, they are used in a generic and descriptive sense only and not for purposes of limitation, the scope of the invention being defined by the following claims.

That which is claimed:

1. A method of provisioning software, comprising:
providing a repository that contains a software trove;
generating a local changeset that represents only differences between a version of the software trove on the repository and a corresponding version of the software trove on a first local system;
wherein the local changeset comprises a representation of a difference between metadata associated with at least one file on the repository and metadata associated with at least one file on the first local system;
committing the local changeset to the software trove in a new development branch on the repository to update the version of the software trove on the repository;
updating a version of a software trove on a second local system corresponding to the version of the software trove on the first local system based on the version of the software trove of the new development branch on the repository; and
committing an inverse changeset to the software trove in the new development branch on the repository, wherein the inverse changeset represents a rollback of the local changeset.

2. The method of claim 1, wherein the local changeset represents a difference between at least one file on the repository and at least one file on the first local system.

3. The method of claim 1, the method further comprising:
communicating the local changeset to a second local system; and
updating a version of a software trove on the second local system corresponding to the version of the software trove on the first local system based on the communicated local changeset.

4. The method of claim 3, wherein updating the software trove on the second local system comprises changing at least one element of the software trove on the second local system, the method further comprising:
updating the software trove on the second local system based on the version of the software trove on the repository while preserving the change to the at least one element of the software trove on the second local system.

5. The method of claim 1, wherein the local changeset represents addition and/or deletion of at least one file on the first local system relative to the repository, and/or addition and/or deletion of metadata associated with the at least one file on the first local system.

6. A software provisioning system, comprising:
a repository that contains a software trove; and
a data processing system, comprising:
means for generating a local changeset that represents only differences between a version of the software trove on the repository and a corresponding version of the software trove on a first local system;
wherein the local changeset comprises a representation of a difference between metadata associated with at least one file on the repository and metadata associated with at least one file on the first local system;
means for committing the local changeset to the software trove in a new development branch on the repository to update the version of the software trove on the repository;
means for updating a version of a software trove on a second local system corresponding to the version of the software trove on the first local system based on the version of the software trove of the new development branch on the repository; and
means for committing an inverse changeset to the software trove in the new development branch on the repository, wherein the inverse changeset represents a rollback of the local changeset.

7. The system of claim 6, wherein the local changeset represents a difference between at least one file on the repository and at least one file on the first local system.

8. The system of claim 6, the system further comprising:
means for communicating the local changeset to a second local system; and
means for updating a version of a software trove on the second local system corresponding to the version of the software trove on the first local system based on the communicated local changeset.

9. The system of claim 8, wherein the means for updating the software trove on the second local system comprises changing at least one element of the software trove on the second local system, the method further comprising:
means for updating the software trove on the second local system based on the version of the software trove on the repository while preserving the change to the at least one element of the software trove on the second local system.

10. The system of claim 6, wherein the local changeset represents addition and/or deletion of at least one file on the first local system relative to the repository, and/or addition and/or deletion of metadata associated with the at least one file on the first local system.

11. A computer program product for provisioning software, comprising:
a non-transitory computer readable storage medium having computer readable program code embodied therein, the computer readable program code comprising:
computer readable program code configured to store a software trove on a repository;
computer readable program code configured to generate a local changeset that represents only differences between a version of the software trove on the repository and a corresponding version of the software trove on a first local system;
wherein the local changeset comprises a representation of a difference between metadata associated with at least one file on the repository and metadata associated with at least one file on the first local system
computer readable program code configured to commit the local changeset to the software trove in a new development branch on the repository to update the version of the software trove on the repository;
computer readable program code configured to update a version of a software trove on a second local system corresponding to the version of the software trove on the first local system based on the version of the software trove of the new development branch on the repository; and computer readable program code configured to commit an inverse changeset to the software trove in the new development branch on the repository, wherein the inverse changeset represents a rollback of the local changeset.

12. The computer program product of claim 11, wherein the local changeset represents a difference between at least one file on the repository and at least one file on the first local system.

13. The computer program product of claim 11, the computer program product further comprising:
   computer readable program code configured to communicate the local changeset to a second local system; and
   computer readable program code configured to update a version of a software trove on the second local system corresponding to the version of the software trove on the first local system based on the communicated local changeset.

14. The computer program product of claim 13, wherein the computer readable program code configured to update the software trove on the second local system comprises changing at least one element of the software trove on the second local system, the computer program product further comprising:
   computer readable program code configured to update the software trove on the second local system based on the version of the software trove on the repository while preserving the change to the at least one element of the software trove on the second local system.

15. The computer program product of claim 11, wherein the local changeset represents addition and/or deletion of at least one file on the first local system relative to the repository, and/or addition and/or deletion of metadata associated with the at least one file on the first local system.

16. The method of claim 1, wherein, the at least one file on the repository and the metadata associated therewith being stored as separate entities, and the at least one file on the first local system and the metadata associated therewith being stored as separate entities.

17. The system of claim 6, wherein, the at least one file on the repository and the metadata associated therewith being stored as separate entities, and the at least one file on the first local system and the metadata associated therewith being stored as separate entities.

18. The computer program product of claim 11, wherein, the at least one file on the repository and the metadata associated therewith being stored as separate entities, and the at least one file on the first local system and the metadata associated therewith being stored as separate entities.

\* \* \* \* \*